Patented Mar. 15, 1932

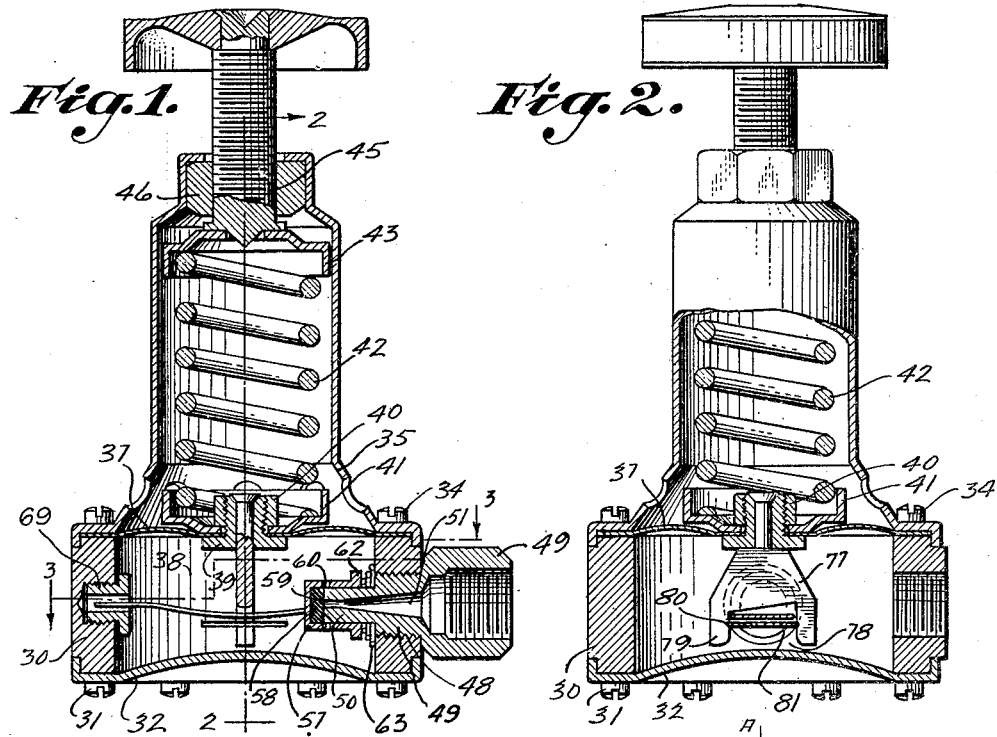
March 15, 1932. G. G. SPENCER 1,849,772
PRESSURE REGULATOR HAVING A ROTATABLE CLOSURE
Filed Feb. 26, 1929 5 Sheets-Sheet 1
INVENTOR
GERALD G. SPENCER
ATTORNEY March 15, 1932. G. G. SPENCER 1,849,772
PRESSURE REGULATOR HAVING A ROTATABLE CLOSURE
Filed Feb. 26, 1929 5 Sheets-Sheet 2
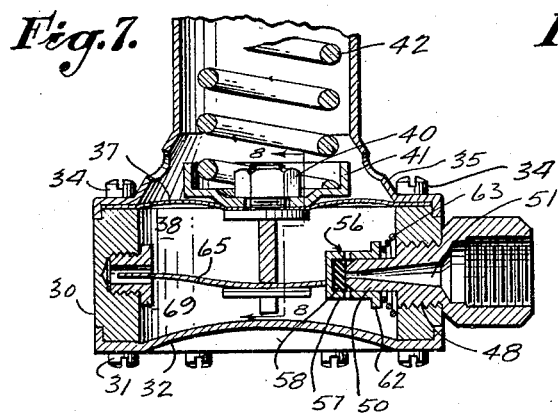
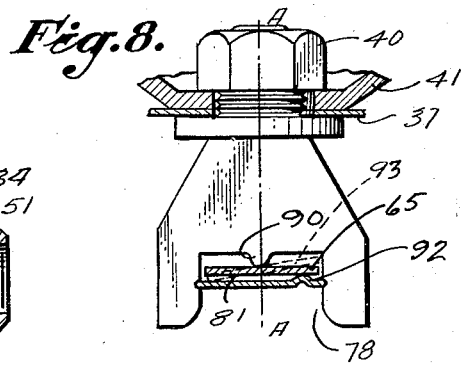
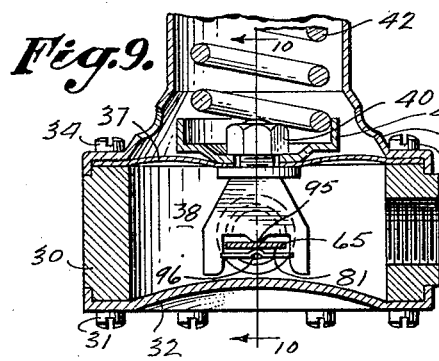
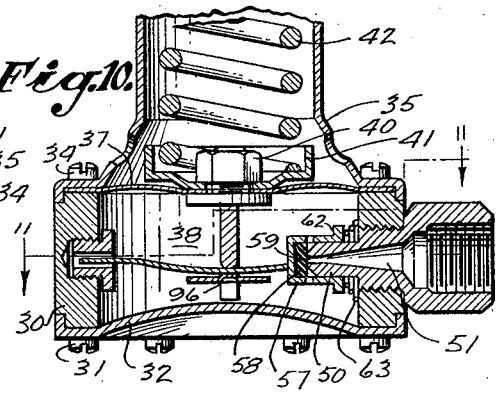
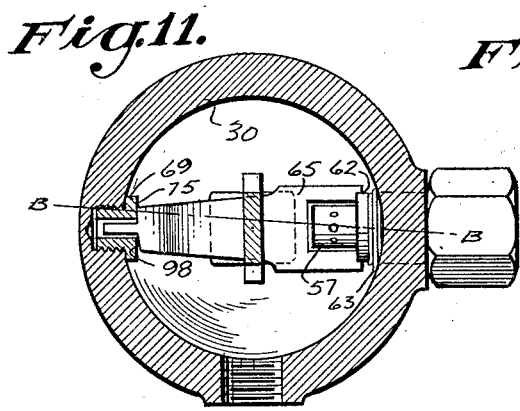
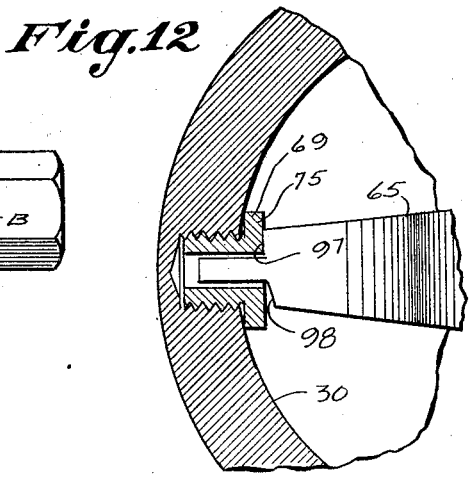
INVENTOR
GERALD G. SPENCER
BY
ATTORNEY March 15, 1932. G. G. SPENCER 1,849,772
PRESSURE REGULATOR HAVING A ROTATABLE CLOSURE
Filed Feb. 26, 1929 5 Sheets-Sheet 3
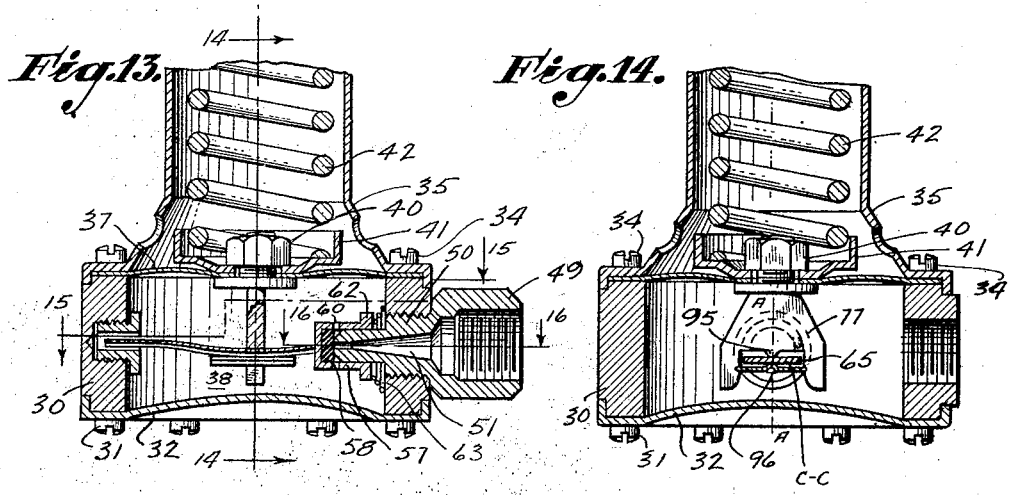
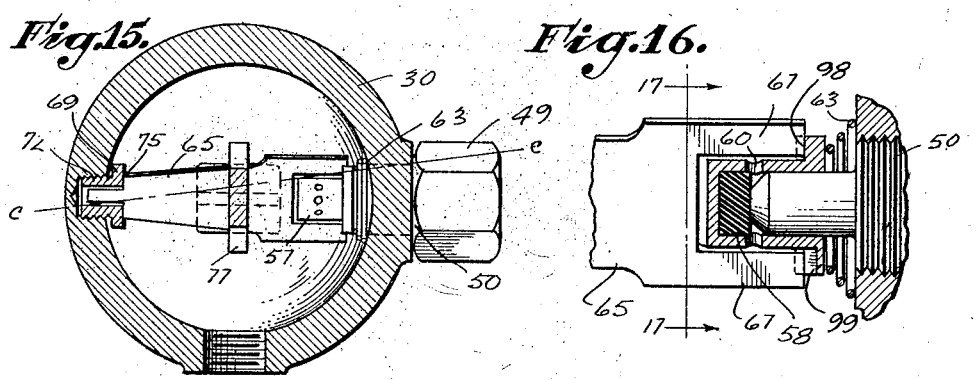
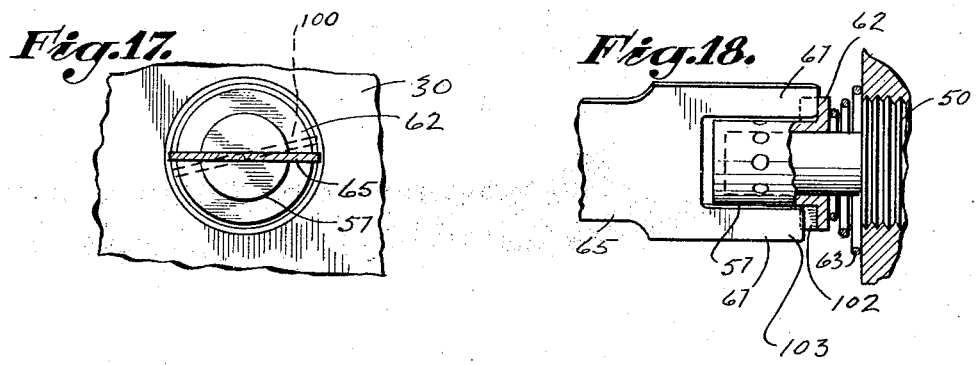
INVENTOR
GERALD G. SPENCER
BY
ATTORNEY

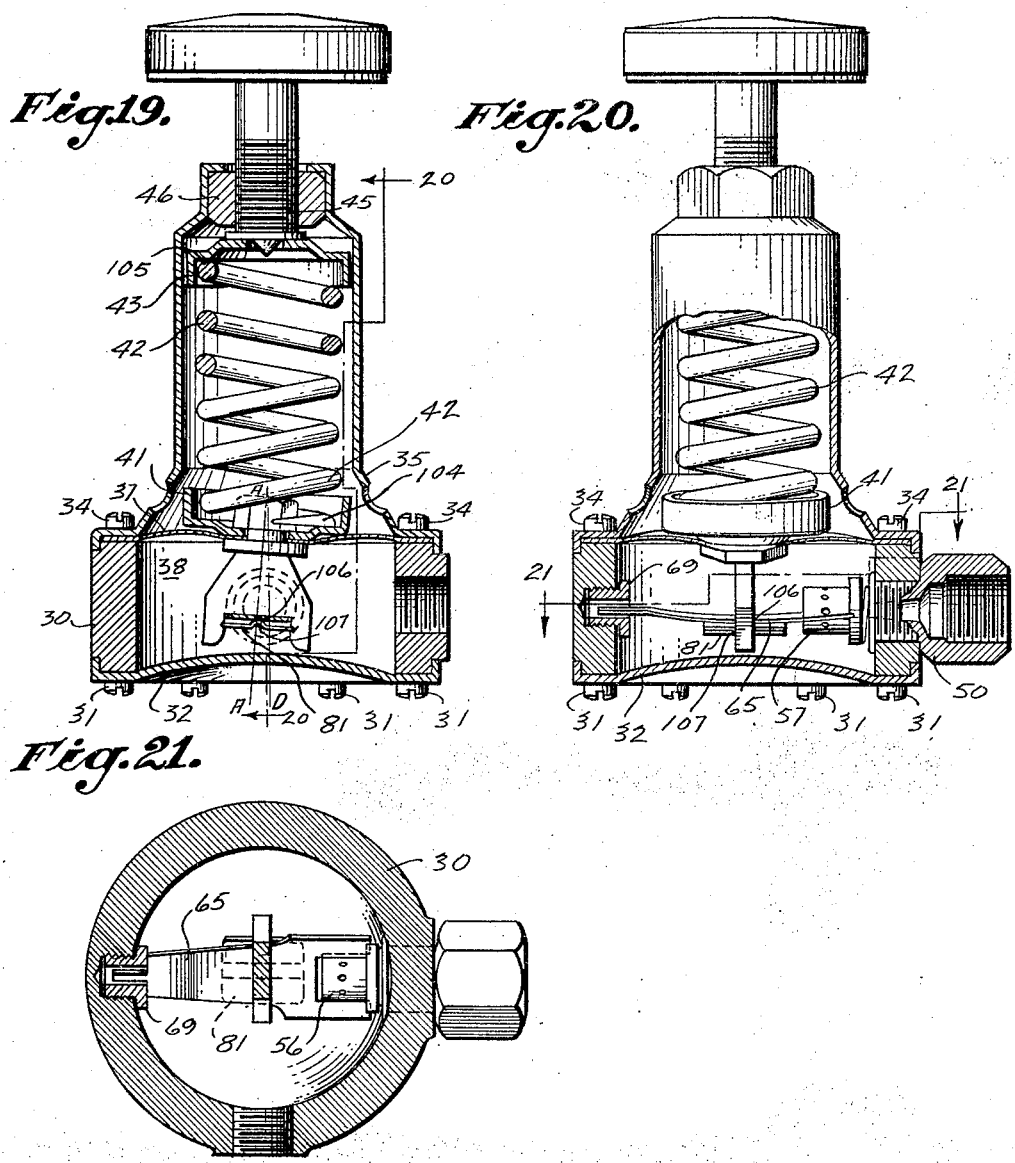

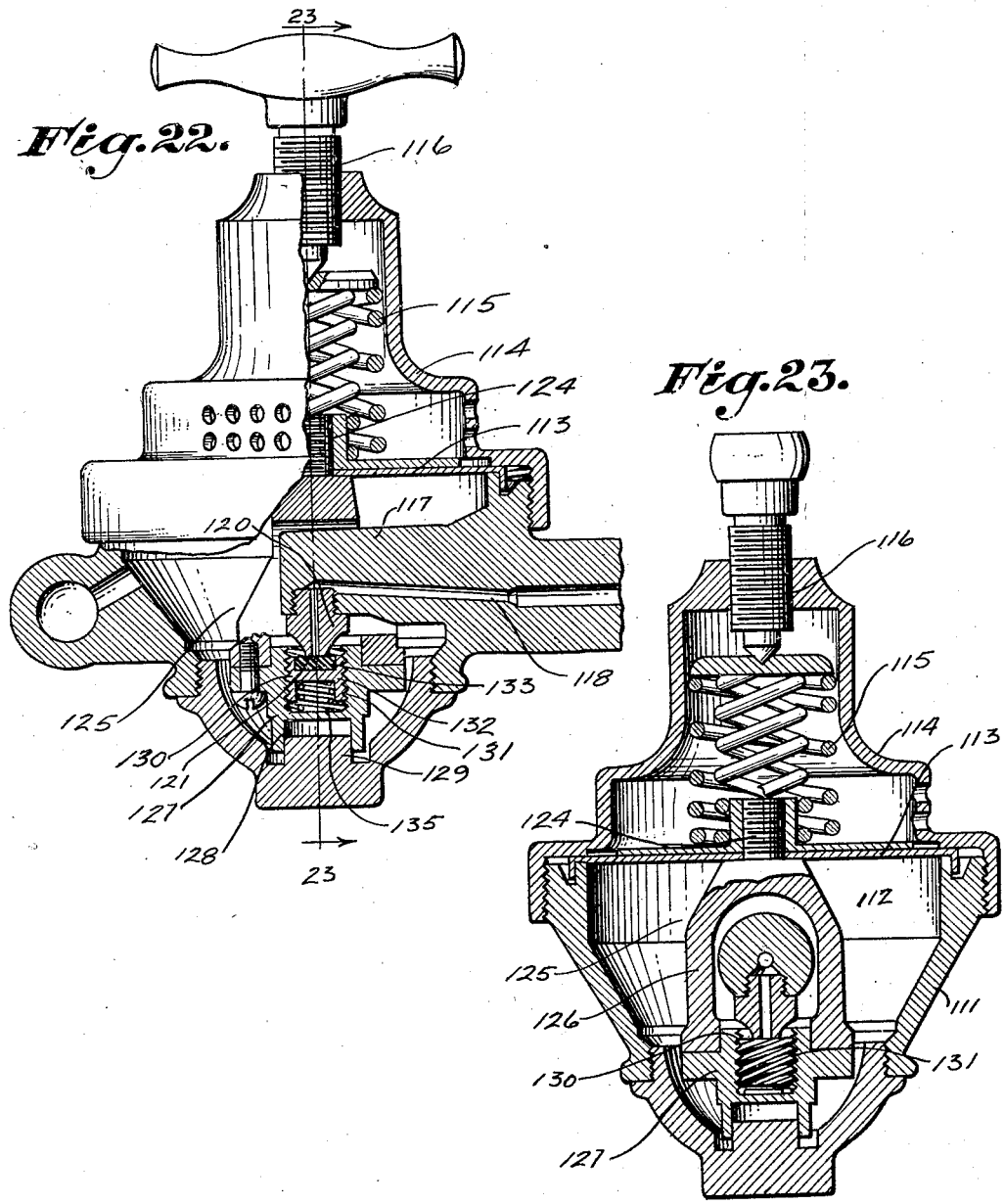

1,849,772

UNITED STATES PATENT OFFICE

GERALD G. SPENCER, OF DENVER, COLORADO, ASSIGNOR TO UNION CARBIDE AND CARBON RESEARCH LABORATORIES, INC., OF NEW YORK, N. Y., A CORPORATION OF NEW YORK

PRESSURE REGULATOR HAVING A ROTATABLE CLOSURE

Application filed February 26, 1929. Serial No. 342,891.

My invention relates to pressure regulators. In its broadest concept it consists of a pressure regulator in which the valve is closed by pressure and relative rotation of the valve parts.

In order that the utility and advantages of my invention may be readily perceived, I shall briefly advert to the disadvantages of pressure regulators in general.

Pressure regulators of the type in general use include a valve controlled by a diaphragm, this valve seating against the end of the gas inlet nozzle to control the influx of gas. The valve is merely pressed against the nozzle. If the faces are true relative to each other and if no foreign matter has entered between them, the valve will completely close. However, if a particle intrudes between the valve and the nozzle, a perfect seat will not result, and the pressure will build up in the chamber of the regulator, higher than the regulator has been set for. The valve is then forced against the nozzle with greater pressure than before and the particle will be crushed or forced into the composition valve disc. Unless either of these actions occurs the pressure will continue to build up in the regulator and the regulator will undoubtedly be damaged. Very often when a hard particle is forced into the valve disc a permanent pit will be left which results in a leaky valve.

In my invention I provide a regulator in which the valve is forced by pressure into engagement with the nozzle, and also there may be a simultaneous relative rotation which will remove the particles from between the valve parts. The preferred operation of my invention is for the valve to first seat pressurally. Then, if a tight seal is not effected the valve will rotate to crush or force out any foreign particle.

It is an object of my invention to provide a pressure regulator in which a closure is effected by pressural contact of the valve parts and also a relative rotation of the valve parts.

It is also an object of my invention to provide a pressure regulator of the character mentioned in which the rotation of the valve is caused by the means which connects the valve to the diaphragm.

It is a still further object of my invention to provide a pressure regulator in which the means connecting the valve to the diaphragm rotates the valve after the valve has engaged its seat.

A further object of this invention is to provide a pressure regulator in which the means for connecting the valve and diaphragm includes a member associated with said valve, adapted to be engaged eccentric of its center of rotation by another member which moves with the diaphragm.

Other objects and advantages of my invention will be pointed out in the following description.

In order to illustrate that the principle on which my invention is based may be employed in various forms I have illustrated various forms of my invention in the accompanying drawings.

Referring to the drawings:

Fig. 1 is a vertical sectional view through one form of my invention.

Fig. 2 is a section taken on the line 2—2 of Fig. 1.

Fig. 3 is a section taken on the line 3—3 of Fig. 1.

Fig. 4 is a section taken on the line 4—4 of Fig. 3.

Fig. 5 is an enlarged fragmentary section taken on the plane of the line 2—2 of Fig. 1, but showing only the clamp and power strut of my invention.

Fig. 6 is a fragmentary perspective view showing the power strut and its associated parts.

Fig. 7 is a section through another form of my invention.

Fig. 8 is a fragmentary section taken on the line 8—8 of Fig. 7.

Fig. 9 is a fragmentary section of another form of my invention.

Fig. 10 is a section taken on the line 10—10 of Fig. 9.

Fig. 11 is a section taken on the line 11—11 of Fig. 10.

Fig. 12 is an enlarged fragmentary section showing the end of the power strut which is received by an adjuster.

Fig. 13 is a section through still another form of my invention.

Fig. 14 is a section taken on the line 14—14 of Fig. 13.

Fig. 15 is a section taken on the line 15—15 of Fig. 13.

Fig. 16 is an enlarged fragmentary section of the valve of the invention and the end of the power strut associated therewith.

Fig. 17 is a section taken on the line 17—17 of Fig. 16.

Fig. 18 is a fragmentary view illustrating a further form of the invention.

Fig. 19 is a section through another form of the invention.

Fig. 20 is a view taken on the line 20—20 of Fig. 19.

Fig. 21 is a section taken on the line 21—21 of Fig. 20.

Fig. 22 is a section taken through a form of my invention in which the principle is applied to the standard form of pressure regulator.

Fig. 23 is a section taken on the line 23—23 of Fig. 22.

I will now describe the general forms of the invention illustrated in Figs. 1 to 21 inclusive.

The numeral 30 represents a body in the form of an annulus. Secured to the lower edge of the body 30 by cap-screws 31 is a cap 32, and secured to the top face of the body 30 by cap-screws 34 is a bonnet 35. The bonnet 35 clamps a pressure-responsive means or diaphragm 37 in place. The body 30, cap 32, and the diaphragm 37 cooperate to provide a chamber 38.

Secured to the diaphragm 37 by means of a bushing 39 and a nut 40 is a retaining member 41, which receives the lower end of a bonnet spring 42. The upper end of the bonnet spring 42 is received in a retainer 43. The retainer 43 is engaged by an adjustment screw 45, which is threadedly retained by a bonnet nut 46, the bonnet nut 46 being supported in the upper part of the bonnet 35. The parts just described constitute the regulating means of the invention. By operating the adjustment screw 45 it is possible to adjust the pressure applied by the spring 42 to the diaphragm 37.

The body 30 has a threaded opening 48 into which a high pressure inlet member 49 is secured. The inner end of the inlet member is provided in the form of a projection or nozzle 50 which surrounds an opening 51 constituting the inlet of the invention.

The body 30 is also provided with a threaded outlet opening 54 to which suitable hose connection or equivalent may be attached.

Adapted to close the inlet 51 is a valve 56. The valve 56 includes a thimble 57 having a cylindrical opening which is closed at one end. Extending into the cylindrical opening is the nozzle 50. Supported at the closed end of the thimble 57 is a valve member 58 adapted to engage a seat 59 formed on the end of the nozzle 50. Openings 60 are formed in the cylindrical wall of the thimble 57 so that when the valve member 58 is disengaged from the seat 59 gas under pressure may pass into the chamber 38. At the right end of the thimble 57, as shown in Fig. 1, is an annular flange 62. Placed between the flange 62 and the adjacent wall of the body 30 is a friction compensating spring 63.

The thimble 57 is adapted to be engaged by a power strut 65 which is preferably formed from a single piece of resilient metal and in form and action constitutes a toggle which longitudinally expands as it is straightened. The end of the power strut which engages the thimble 57 is bifurcated so as to form a central pocket 66, the bifurcations 67 extending on opposite sides of the thimble 57 and engaging in slots 68 formed in the flange 62.

The opposite end of the power strut 65 engages an adjustment member 69, which is threadedly received in a threaded pocket 70 formed in the body 30. The power strut has a tongue 72 which projects into an opening 73 of the adjustment member and has faces 74 which engage an end face 75 of the adjustment member.

Extending downward from the diaphragm 37 is a clamp 77. This stirrup or clamp 77 is rigidly secured to the diaphragm by means of the bushing 39. The lower end of the clamp 77 has a central channel 78 which is open at the bottom. Extending on opposite sides of the channel 78 are legs 79 which define it. The legs 79 extend on opposite sides of the central portion of the power strut 65. Extending across the channel and engaging in recesses 80 formed on the inner faces of the legs 79 is a key 81. The key 81 retains the power strut 65 in the channel 78 in a definite relation thereto. The key 81 cooperates with the bottom of the channel 78 to form a pocket or opening 82 through which the power strut 65 is extended.

The clamp 77, the power strut 65 and the parts associated therewith constitute the operating means of my invention connected to the pressure-responsive means or diaphragm 37 and to the valve. The clamp 77, and in some instances the key 81 constitute the connecting means of the invention which connects the power strut to the diaphragm. The clamp 77 and the power strut 65 and parts associated therewith also constitute motion-transmitting means, whereby motion is transmitted from the diaphragm to the valve.

I have described those parts of my invention which are common to the forms of the invention shown in Figs. 1 to 21 inclusive. In the following portion of the description I shall refer to the various groups of Figures which illustrate the various forms of the invention and shall only describe those features of construction which are peculiar to each form of the invention. It shall be understood, therefore, that the numerals 30 to 82 inclusive apply to each form of the invention shown in Figs. 1 to 21 inclusive.

Referring now particularly to Figs. 1 to 6 inclusive, the clamp 77 is provided with the channel 78, the upper wall 85 of which is inclined. By "inclined" I mean that the wall 85 is at an angle to a perpendicular of a line A—A of Fig. 5, which is parallel to the plane of motion of the clamp 77.

In this form of the invention it is desired to cause the valve 56 not only to pressurally engage the seat 59 but also to be rotated if necessary to form a complete closure. The operation of this form of the invention is substantially as follows:

Assume that the parts are in the position shown in Figs. 1, 2, 3, 4, and 6. The operator advances the adjustment screw 45 downward so that the diaphragm 37 is moved downward and the clamp 77 moved downward along the axis A—A. It will be evident that since the left edge of the inclined wall 85 (reference being had to Fig. 5) is lowest, the left edge of the power strut will be engaged. This engagement causes the entire power strut 65, adjustment member 69 and valve 56 to rotate from the position shown in Figs. 1, 2, 3, 4, and 6 into such a position that the power strut occupies a position shown in full lines in Fig. 5. In this position the upper face of the power strut 65 lies in a plane parallel to the wall 85. The portion of the power strut 65 extending through the opening 82 has moved from dotted line position 88 into full line position in Fig. 5.

When the diaphragm 37 and the clamp 77 are depressed the central portion of the power strut is moved downward with the result that the right end thereof moves towards the center, and this allows the valve 56 to be moved from seated position. The inlet 51 is then opened and gas under pressure will pass into the chamber 38. As pressure builds up in the chamber 38 the diaphragm is gradually moved upward against the action of the regulating means, which forces downward against it, and the clamp 77 is moved upward. When the clamp moves upward the power strut tends to straighten of its own accord. As previously pointed out the power strut is made from a resilient metal and therefore it at all times tends to straighten. The power strut therefore moves upward of its own accord with the clamp 77, thus moving the valve 56 towards its seat. It is important to observe that during this operation the central portion of the power strut is not forced upward by the key 81. When the parts move upward to the extent that the valve 56 has seated, the inflow of gas to the chamber 38 will be arrested, if the valve forms a tight seal.

However, if the valve does not form a tight seal for the reason of imperfect seating, which may be caused by various things, for example, the presence of a particle of foreign material between the valve member 58 and the seat 59, gas will continue to leak in the chamber 38 and the pressure will be built up therein. Due to this increase in pressure after seating of the valve 56, the diaphragm and the clamp continue to move upward.

Due to the fact that the seating of the valve 56 prevents the power strut from further straightening of its own accord, the key 81 comes into contact with the power strut and rotates it from the position shown in full lines in Fig. 5 into the position shown by dotted lines 88. The result of this action is to turn the valve 56 while it is in pressural contact with the seat 59. This combination of pressural force and rotative force is effective in disposing of the foreign particle which prevents the valve from forming a perfect seal or disposes of any condition which prevents this perfect seal. It is desirable to have the adjuster 69 restrained from rotation. This may be accomplished by making the threads thereof and of the opening a rather close fit, so that the friction will prevent the adjuster from rotating with the strut. This may also be accomplished by placing a washer between the strut and the adjuster.

In the form of the invention which I have just discussed it will be seen that the rotative action is accomplished by the connecting means engaging the power strut in such a manner that it will be rotated during and after the valve reaches its seat. I have observed that very often the power strut is rotated during the seating of the valve. I therefore do not wish to be limited to a construction in which the rotation occurs only after the valve has seated. The rotation may occur slightly before, during, and after seating of the valve.

In the form of my invention shown in Figs. 7 and 8 the clamp 77 is provided with a central bearing 90 which depends downward from the upper wall of the channel 78 on the axis A—A. The key 81 is provided with a bearing 92, which is offset from the axis A—A, as shown in Fig. 8.

In the operation of this form of the invention, when the power strut 65 is bent, it is engaged by the central bearing 90 which is on the axis A—A. In other words, the central part of the power strut 65 is engaged and no rotation will take place. The valve being open, pressure will build up in the chamber 38, and the diaphragm and clamp will move upward. The power strut moves upward of its own accord until the valve is seated, and then if a perfect seat is not formed there will be a leakage and an increased pressure in the chamber 38. As the clamp 77 continues to move upward the offset bearing 92 engages the power strut 65 eccentrically of its center of rotation with the result that the power strut is swung from full line position in Fig. 8 into dotted line position 93. This causes a rotation of the valve 56, which, as previously explained, is effective in disposing of the cause for leakage of gas into the chamber 38.

In this form of the invention it will be seen that the power strut 65 is engaged eccentrically of its center of rotation so that the power strut and the valve 56 will be rotated.

In the form of the invention shown in Figs. 9 to 12 inclusive the clamp 77 is provided with a central bearing 95 which extends downward to engage the power strut 65, and the key 81 is provided with a central bearing 96, which extends upward to engage the power strut 65. Both of the central bearings 95 and 96 are provided on the axis A—A of the clamp 77. The distance between the central bearings 95 and 96 is substantially that of the thickness of the power strut 65, so that there will be no appreciable relative up and down movement between the power strut and the clamp. As best shown in Fig. 12, the end of the power strut 65 which engages the face 75 of the adjustment member 69 is provided with a side face 97 which engages the face 75 and is provided with an angular side face 98, which is ordinarily out of engagement with the face 75. In the forms of the invention shown in Figs. 1 to 8 inclusive there has been contact between the power strut 65 and the adjustment member 69 on both sides of the tongue 72, so that the center of rotation of the power strut is the geometric center of it. In the form of the invention now being described, due to the fact that there is contact on one side of the power strut at the end which engages the adjustment member 69, the center of rotation of the power strut is in the plane indicated by the line B—B. It will be seen that where the line B—B passes through the opening 82 of the clamp 77 the axis A—A and the center of rotation B—B are offset.

In this form of the invention the power strut tends to straighten until the valve becomes seated. Therefore, if there is a leakage of gas into the chamber 38 the clamp 77 will move upward and the power strut will be engaged by the central bearing 96 of the key 81. Due to the fact that the central bearing 96 engages the power strut 65 eccentrically of its center of rotation B—B the power strut will be rotated in a clockwise direction in Fig. 9. The power strut and the valve 56 will rotate together with the same result as in the forms of my invention previously described. It will be seen that in this form of the invention the rotative action is obtained by the designing of the power strut so that the center of rotation is swung out of alignment with the axis A—A.

In the form of the invention shown in Figs. 13 to 17 inclusive the clamp 77 and the key 81 are constructed as in Figs. 9 to 12 inclusive, being provided with central bearings 95 and 96, which are formed on the axis A—A of the clamp 77. The adjustment end of the power strut 65, however, is formed so that it bears against the face 75 of the adjustment member 69 on both sides of the tongue 72.

As shown in Fig. 6 the legs or furcations 67 of the power strut 65 extend into slots 98 and 99 which are formed in the flange 62 of the thimble 57. The ends of the furcations 67 terminate in the same plane, but the slot 99 is deeper than the slot 98, with the result that one of the furcations does not engage the thimble 57. In view of this eccentric engagement of the valve end of the power strut 65, the center of rotation of the power strut is offset from its geometric center and is indicated by the line C—C.

When the diaphragm and clamp move upward as a result of an increase in pressure in the chamber 38 the power strut will straighten of its own accord as in previous forms of the invention until the valve 56 has been seated. If there is a leakage into the chamber 38 the diaphragm and clamp will continue to move upward and the power strut will be engaged by the central bearing 96. Due to the fact that the center of rotation C—C of the power strut 65 is eccentrically disposed and is not intersected by the axis A—A, the central bearing 96 will engage the power strut eccentrically of its center of rotation and cause it to rotate from the position shown in full lines in Fig. 17 into a position indicated by dotted lines 100. This causes the valve 56 to rotate, with the result that the valve rotates on the seat 59 and eliminates anything which has caused imperfect seating of the valve.

In Fig. 18 I show a fragmentary view illustrating another form of the invention. In this form of the invention the furcations 67 extend into slots 102 of the flange 62 of the thimble 57, which slots 102 are of the same depth. One furcation 67, however, which I indicate by the numeral 103 is shorter than the other, with the result that there is engagement only on one side of the thimble 57. This has the same effect as making one slot in the flange 62 deeper than the other and consequently the axis of rotation of the power strut is made eccentric. This form of the invention operates in the same manner as the form of the invention shown in Figs. 13 to 17 inclusive.

In Figs. 19 to 21 inclusive, the lower end of the bonnet spring 42 is provided with an end 104 which is not parallel with the upper end 105 thereof. This causes the diaphragm to be swung so that the axis A—A is swung from a perpendicular position. The channel of the clamp 77 is provided with a top wall 106, which is perpendicular to the axis A—A. The key 81 is provided with a central bearing 107 which engages the power strut so that the power strut is clamped against the top wall 106. In the operation of this form of the invention the twisting or rotation of the valve is accomplished by virtue of the fact that when the diaphragm is moved by the pressure in the chamber 38 the clamp 77 swings so that the axis A—A assumes a different position.

In other words, when pressure in the chamber 38 builds up, the axis A—A may move from the position shown in full lines into the position indicated by the dotted line A—D. It will therefore be seen that as a result of the swinging of the clamp 77 the power strut 65 will be swung so as to rotate the valve 56.

In Figs. 22 and 23 I illustrate my invention applied to the form of pressure regulator now in general use. In these figures the numerals previously utilized are not applied. Referring to these figures, this form of the invention comprises a body 111 having a cavity 112, the upper portion of which is closed by a diaphragm 113 secured in place by means of a bonnet 114. Adapted to press against the diaphragm 113 are springs 115. The pressure of the springs 115 against the diaphragm is controlled by an adjustment screw 116. Extending into the cavity 112 is an arm 117 having an inlet 118 formed therein. Threadedly secured to the inner end of the arm 117 on an axis concentric with the center of the diaphragm 113 is a nozzle 120 having a seating face 121. Secured to the center of the diaphragm 113 by a threaded pin 124 is a depending yoke 125. The yoke 125 has legs 126 which extend downward on opposite sides of the inner end of the arm 117 and the nozzle 120. Secured to the lower ends of the legs 126 of the yoke 125 is a plate 127. The plate 127 has a lower cavity 128 into which a centralizing projection 129 of the body may extend.

Formed in the plate concentric with the axis or center line of the diaphragm 113 is a cavity 130. The cavity 130 has threads 131 which are of a very great pitch. The threads may be double threads or triple threads. Screwed into the cavity 130 is a valve member 132 carrying a valve closure 133 adapted to engage the seat 121 of the nozzle 120. Placed in the cavity 130 below the valve member 132 is a spring 135. In this form of the invention when pressure builds up in the cavity 112 the diaphragm and the yoke are moved upward. The yoke moves the plate upward until the valve member engages the nozzle 120. If this does not form a tight seal there is a leakage and the pressure increases in the cavity 112. This causes the diaphragm and associated parts to move upward. The valve member, however, is prevented from moving upward due to its engagement with the seat 121 of the nozzle. The plate 127 however moves upward relative to the valve member 132 and the result is that the valve member 132 is rotated by the action of the great pitch threads 131.

From the foregoing description in which I have considered numerous embodiments of the invention it will be seen that the invention in its broad aspect consists of a pressure regulator in which closure of the valve is accomplished by pressure, and if necessary, rotation of the valve parts. I have illustrated that the principle is susceptible of many modifications. I therefore wish to be limited only by the appended claims.

I claim as my invention:

1. In a pressure regulator, the combination of: walls forming a chamber, and an inlet and outlet therefor; a pressure-responsive means forming a wall of said chamber; regulating means operating on said pressure-responsive means; a valve adapted to close said inlet; and operating means connected to said pressure-responsive means and said valve, said operating means including a toggle member adapted to close and rotate said valve.

2. In a pressure regulator, the combination of: walls forming a chamber, and an inlet and outlet therefor; a pressure-responsive means forming a wall of said chamber; regulating means operating on said pressure-responsive means; a valve adapted to close said inlet; and operating means connected to said pressure-responsive means and said valve, said operating means being designed for moving said valve substantially without rotation into a position to close said inlet, and to thereafter rotate said valve.

3. In a pressure regulator, the combination of: walls forming a chamber, and an inlet and outlet therefor; a pressure-responsive means forming a wall of said chamber; regulating means operating on said pressure-responsive means; a valve adapted to close said inlet; and operating means connected to said pressure-responsive means and said valve, said operating means including a primary part connected to said pressure-responsive means and a secondary part associated with said valve, said secondary part being a toggle member adapted to be straightened and rotated by said primary part.

4. In a pressure regulator, the combination of: walls forming a chamber, and an inlet and outlet therefor; a pressure-responsive means forming a wall of said chamber; regulating means operating on said pressure-responsive means; a valve adapted to close said inlet;

and operating means connected to said pressure-responsive means and said valve, said operating means including a primary part connected to said pressure-responsive means and a secondary part associated with said valve, said secondary part having an axis of rotation extending at an angle to the plane of movement of said primary part, and being adapted to be engaged eccentrically of said axis of rotation by said primary part.

5. In a pressure regulator, the combination of: walls forming a chamber, and an inlet and outlet therefor; a pressure-responsive means forming a wall of said chamber and being acted upon by the pressure in said pressure chamber; regulating means for exerting a force on said pressure-responsive means in opposition to the force applied by the gas pressure in said pressure chamber; a valve for closing said inlet, said valve being movable in a plane at an angle to the movement of said pressure-responsive means; and motion-transmitting means connected to said pressure-responsive means and said valve for positively opening and closing said valve by engaging a seat around said inlet, said motion-transmitting means gradually increasing the force applied to said valve as said valve is moved toward closed position, and to rotate said valve when same engages said seat.

6. In a pressure regulator the combination of: walls forming a chamber, and an inlet and outlet therefor; a pressure-responsive means forming a wall of said chamber and being acted upon by the pressure in said pressure chamber; regulating means for exerting a force on said pressure-responsive means in opposition to the force applied by the gas pressure in said pressure chamber; a valve for closing said inlet, said valve being movable in a plane at an angle to the movement of said pressure-responsive means; and motion-transmitting means connected to said pressure-responsive means and said valve for positively opening and closing said valve by engaging a seat around said inlet, said motion-transmitting means including a power strut which is operated by said pressure-responsive means, and gradually increasing the force applied to said valve as said valve is moved toward closed position, and rotating said valve when same engages said seat.

7. In a pressure regulator, the combination of: walls forming a chamber, and an inlet and outlet therefor; a pressure-responsive means forming a wall of said chamber and being acted upon by the pressure in said pressure chamber; regulating means for exerting a force on said pressure-responsive means in opposition to the force applied by the gas pressure in said pressure chamber; a valve for closing said inlet, said valve being movable in a plane at an angle to the movement of said pressure-responsive means; a power strut for operating said valve, one end of said power strut engaging said valve; and connecting-means for connecting said power strut and said pressure-responsive means whereby said power strut is moved by said pressure-responsive means, said power strut being straightened as said valve moves toward closed position so that the force applied to said valve gradually increases, said connecting-means causing said power strut and said valve to rotate when said valve seats.

8. In a pressure regulator, the combination of: walls forming a chamber, and an inlet and outlet therefor; a pressure-responsive means forming a wall of said chamber and being acted upon by the pressure in said pressure chamber; regulating means for exerting a force on said pressure-responsive means in opposition to the force applied by the gas pressure in said pressure chamber; a valve for closing said inlet, said valve being movable in a plane at an angle to the movement of said pressure-responsive means; a power strut formed of a one-piece spring for operating said valve, one end of said power strut engaging said valve; and connecting-means for connecting said power strut and said pressure-responsive means whereby said power strut is moved by said pressure-responsive means, said power strut being straightened as said valve moves toward closed position so that the force applied to said valve gradually increases, said connecting-means causing said power strut and said valve to rotate when said valve seats.

9. In a pressure regulator, the combination of: walls forming a chamber, and an inlet and an outlet therefor; a diaphragm forming a wall for said chamber, and being acted upon by the gas pressure in said pressure chamber; an adjustable spring acting upon said diaphragm in opposition to the gas pressure in said pressure chamber; a valve for closing said inlet, said valve being movable in a plane at an angle to the movement of said diaphragm: a one-piece power strut for closing said valve; and connecting-means for connecting said power strut and said diaphragm through which said diaphragm straightens said power strut to close said valve, and rotates said power strut by virtue of said connecting-means engaging said power strut eccentrically of the center of rotation of said power strut.

10. In a pressure regulator, the combination of: walls forming a chamber, and an inlet and an outlet therefor; a diaphragm forming a wall for said chamber, and being acted upon by the gas pressure in said pressure chamber; an adjustable spring acting upon said diaphragm in opposition to the gas pressure in said pressure chamber; a valve for closing said inlet, said valve being movable in a plane at an angle to the movement of said diaphragm; a one-piece power strut for closing said valve, said power strut being bowed by compression so that said power strut yieldably holds said valve in closed position; and connecting-means for connecting said power strut and said diaphragm through which said diaphragm straightens said power strut to close said valve, and rotates said power strut by virtue of said connecting-means engaging said power strut eccentrically of the center of rotation of said power strut.

11. In a pressure regulator, the combination of: walls forming a chamber, and an inlet and outlet therefor; a pressure-responsive means forming a wall of said chamber; regulating means operating on said pressure-responsive means; a valve adapted to close said inlet; and operating means for said valve, said operating means including a flexible rotatable member and connecting said pressure-responsive means and said valve whereby to bodily move and rotate said valve so as to produce a tight closure of said inlet.

12. In a pressure regulator, the combination of: walls forming a chamber, and an inlet and outlet therefor; a pressure-responsive means forming a wall of said chamber; regulating means operating on said pressure-responsive means; a valve adapted to close said inlet; a stationary member diametrally opposite to said inlet; a flexible rotatable member extending from said stationary member to said valve; and a part moved by said pressure-responsive means for actuating said flexible rotatable member, said stationary member, said valve, said flexible rotatable member, and said part cooperating in a manner to produce rotation of said valve whereby to accomplish a tight closure of said inlet.

13. In a pressure regulator, the combination of: walls forming a chamber, and an inlet and outlet therefor; a pressure-responsive means forming a wall of said chamber; regulating means operating on said pressure-responsive means; a valve adapted to close said inlet; a stationary member diametrally opposite to said inlet; a flexible rotatable member extending from said stationary member to said valve; and a part moved by said pressure-responsive means for actuating said flexible rotatable member, said part engaging said flexible rotatable member in a manner to produce rotation of said flexible rotatable member and consequently said valve.

14. A regulator of the character described having pressure responsive means, including: a body having an inlet; a valve for closing said inlet; a strut support; and a strut extending between said support and said valve for controlling the movement of said valve, said strut being engaged by said pressure responsive means and being so formed as to accomplish rotation of said valve when moved by said pressure responsive means.

15. A regulator of the character described having pressure responsive means, including: a body having an inlet; a valve for closing said inlet; a strut support; and a flexible strut extending between said support and said valve for controlling the movement of said valve, said flexible strut being engaged by said pressure responsive means and being so formed as to accomplish rotation of said valve when flexed by said pressure responsive means.

16. A regulator of the character described having pressure responsive means, including: a body having an inlet; a valve for closing said inlet; a strut support; and a strut extending between said support and said valve for controlling the movement of said valve, said strut being engaged by said pressure responsive means and being so formed as to apply eccentric pressure for rotating said valve when moved by said pressure responsive means.

17. A regulator of the character described having pressure responsive means, including: a body having an inlet; a valve for closing said inlet; a strut support; and a flexible strut extending between said support and said valve for controlling the movement of said valve, said flexible strut being engaged by said pressure responsive means and being so formed as to apply eccentric pressure for rotating said valve when flexed by said pressure responsive means.

18. A regulator of the character described having pressure responsive means, including: a body having an inlet; a valve for closing said inlet; a strut support; and a strut extending between said support and said valve, said strut being engaged by said pressure responsive means and having the length of the sides thereof so proportioned relative to said support and said valve that a closing and rotating force will be applied to said valve when said strut is moved by said pressure responsive means.

19. A regulator of the character described having pressure responsive means, including: a body having an inlet; a valve for closing said inlet; a strut support; and a flexible strut extending between said support and said valve, said flexible strut being engaged by said pressure responsive means and having the length of the sides thereof so proportioned relative to said support and said valve that a closing and rotating force will be applied to said valve when said strut is flexed by said pressure responsive means.

20. A regulator of the character described having pressure responsive means, including: a body having an inlet; a valve for closing said inlet, there being means for guiding said valve in its movement relative to said inlet; a strut support; and a strut extending between said support and said valve, said strut being engaged by said pressure responsive means and having the length of the sides thereof so proportioned relative to said support and said valve that a closing and rotating force will be applied to said valve when said strut is moved by said pressure responsive means.

21. A regulator of the character described having pressure responsive means, including: a body having an inlet; a valve for closing said inlet, there being means for guiding said valve in its movement relative to said inlet; a strut support; and a flexible strut extending between said support and said valve, said flexible strut being engaged by said pressure responsive means and having the length of the sides thereof so proportioned relative to said support and said valve that a closing and rotating force will be applied to said valve when said strut is flexed by said pressure responsive means.

22. A regulator of the character described having pressure responsive means, including: a body having an inlet; a valve for closing said inlet, there being means for guiding said valve in its movement relative to said inlet; a strut support; and a strut extending between said support and said valve for controlling the movement of said valve, said strut being engaged by said pressure responsive means and being so formed as to accomplish rotation of said valve when moved by said pressure responsive means.

23. A regulator of the character described having pressure responsive means, including: a body having an inlet; a valve for closing said inlet, there being means for guiding said valve in its movement relative to said inlet; a strut support; and a strut extending between said support and said valve for controlling the movement of said valve, said strut being engaged by said pressure responsive means and being so formed as to apply eccentric pressure for rotating said valve when moved by said pressure responsive means.

24. A regulator of the character described having pressure responsive means, including: a body having an inwardly projecting inlet member enclosing an inlet opening; a strut support aligned with said inlet member; a valve guided on said inlet member and adapted to close the inlet opening thereof, said valve having diametrally opposed engagement faces; and a bifurcated flexible strut extending from engagement with said support to said engagement faces of said valve, said strut being engaged by said engagement faces and being so formed as to produce rotation of said valve when flexed by said pressure responsive means.

25. A regulator of the character described having pressure responsive means, including: a body having an inwardly projecting inlet member enclosing an inlet opening; a strut support aligned with said inlet member; a valve guided on said inlet member and adapted to close the inlet opening thereof, said valve having diametrally opposed engagement faces and a bifurcated flexible strut extending from engagement with said support to said engagement faces of said valve, said strut being engaged by said engagement faces and being so formed as to make thrust engagement with one of said engagement faces of said valve but not with the other engagement face of said valve.

26. A regulator of the character described having pressure responsive means, including: a body having an inwardly projecting inlet member enclosing an inlet opening; a strut support aligned with said inlet member; a valve guided on said inlet member and adapted to close the inlet opening thereof, said valve having diametrally opposed engagement faces; and a bifurcated flexible strut extending from engagement with said support to said engagement faces of said valve, said strut being engaged by said pressure responsive means and having the lengths of the respective sides thereof so proportioned with respect to the distances between the engagement faces of said valve and said support that an eccentric thrust will be exerted by said strut on said valve when said strut is flexed by said pressure responsive means.

27. A regulator of the character described having pressure responsive means, including: a body having an inwardly projecting inlet member enclosing an inlet opening; a strut support aligned with said inlet member; a valve guided on said inlet member and adapted to close the inlet opening thereof, said valve having diametrally opposed engagement faces; and a birfurcated flexible strut extending from engagement with said support to said engagement faces of said valve, said strut being engaged by said pressure responsive means and having the bifurcated ends thereof so proportioned relative to the distance between each of said engagement faces of said valve and said support that said strut will make eccentric thrust engagement with said valve.

28. A regulator of the character described having pressure responsive means, including: a body having an inwardly projecting inlet member enclosing an inlet opening; a strut support aligned with said inlet member; a valve guided on said inlet member and adapted to close the inlet opening thereof, said valve having diametrally opposed slots, one of said slots being of greater depth than the other; and a bifurcated flexible strut extending from engagement with said support to engagement with said slots of said valve, said strut being engaged by said pressure responsive means and having bifurcated legs at the end thereof, said legs being of the same length and engaging said slots of said valve in a manner to apply rotational force to said valve when flexed by said pressure responsive means.

29. A pressure regulator of the character described having a pressure responsive means and a control valve operated in accordance with movement of said pressure responsive means, including: means for applying pressure to said pressure responsive means in an eccentric manner whereby to cause rotation of said pressure responsive means, said rotation being transmitted from said pressure responsive means to said control valve.

30. A pressure regulator of the character described having a pressure responsive means and a control valve operated in accordance with movement of said pressure responsive means, including: a regulating spring adapted to apply pressure to said pressure responsive means in an eccentric manner whereby to cause rotation of said pressure responsive means, said rotation being transmitted from said pressure responsive means to said control valve.

31. A pressure regulator of the character described having a pressure responsive means and a control valve operated in accordance with movement of said pressure responsive means, including: means for applying pressure to said pressure responsive means in an eccentric manner whereby to cause rotation of said pressure responsive means, there being an actuating strut for transmitting the motion of said pressure responsive means to said control valve whereby to close and rotate said control valve.

32. A pressure regulator of the character described having a pressure responsive means and a control valve operated in accordance with movement of said pressure responsive means, including: a regulating spring adapted to apply pressure to said pressure responsive means in an eccentric manner whereby to cause rotation of said pressure responsive means, there being an actuating strut for transmitting the motion of said pressure responsive means to said control valve whereby to close and rotate said control valve.

33. A pressure regulator of the character described, including: walls forming a chamber, and an inlet and outlet therefor; a diaphragm forming a wall for said chamber and being acted on by fluid pressure in said chamber; an adjustable spring acting on said diaphragm in opposition to said fluid pressure in said chamber, said spring being so formed as to exert an eccentric pressure against said diaphragm; a valve for closing said inlet; and means for transmitting the movement of said diaphragm to said valve.

34. A pressure regulator of the character described, including: walls forming a chamber, and an inlet and outlet therefor; a diaphragm forming a wall for said chamber and being acted on by fluid pressure in said chamber; an adjustable spring acting on said diaphragm in opposition to said fluid pressure in said chamber, said spring being so formed as to exert an eccentric pressure against said diaphragm; a valve for closing said inlet, said valve being movable in a plane at an angle to the movement of said diaphragm; a one-piece power strut engaging said valve for closing said valve; and means for transmitting the movement of said diaphragm to said power strut whereby to close and rotate said valve.

35. A pressure regulator of the character described, including: walls forming a chamber, and an inlet and outlet therefor; a diaphragm forming a wall for said chamber and being acted on by fluid pressure in said chamber; an adjustable spring acting on said diaphragm in opposition to said fluid pressure in said chamber, said spring being so formed as to exert an eccentric pressure against said diaphragm; a valve for closing said inlet, said valve being movable in a plane at an angle to the movement of said diaphragm; a one-piece power strut engaging said valve for closing said valve; and connecting means for connecting said power strut and said diaphragm, through which means said diaphragm straightens and rotates said power strut so as to close and rotate said valve by virtue of the rotational movement of said diaphragm under influence of pressure eccentrically applied thereto by said spring.

36. In a pressure regulator, the combination of: walls forming a chamber having an inlet and an outlet, there being a pressure responsive means forming a wall of said chamber; regulating means operating eccentrically on said pressure responsive means; a valve adapted to close said inlet; and operating means connecting said pressure responsive means and said valve, whereby the rotative movement of said pressure responsive means will produce a closing and rotating movement of said valve.

37. In a pressure regulator, the combination of: walls forming a chamber having an inlet and an outlet, there being a pressure responsive means forming a wall of said chamber; regulating means operating eccentrically on said pressure responsive means; a valve adapted to close said inlet; and operating means connected to said pressure responsive means and said valve, said operating means including a primary part connected to said pressure responsive means and a secondary part engaging said valve, whereby the rotational movement of said pressure responsive means will be transmitted in a manner to close and rotate said valve.

In testimony whereof, I have hereunto set my hand at Denver, Colorado, this 18th day of February, 1929.

GERALD G. SPENCER.